(12) United States Patent
Currin et al.

(10) Patent No.: US 7,246,494 B2
(45) Date of Patent: Jul. 24, 2007

(54) METHODS AND APPARATUS FOR FABRICATING GAS TURBINE ENGINE COMBUSTORS

(75) Inventors: Aureen Cyr Currin, Reading, MA (US); Kamil Bazyli Kaczorowski, Warsaw (PL); John Carl Jacobson, Melrose, MA (US); Joseph Douglas Monty, Boxford, MA (US)

(73) Assignee: General Electric Company, Schenectady, NY (US)

( * ) Notice: Subject to any disclaimer, the term of this patent is extended or adjusted under 35 U.S.C. 154(b) by 291 days.

(21) Appl. No.: 10/953,318

(22) Filed: Sep. 29, 2004

(65) Prior Publication Data

US 2006/0064983 A1    Mar. 30, 2006

(51) Int. Cl.
*F23R 3/14*    (2006.01)
(52) U.S. Cl. .......................... 60/748; 60/752
(58) Field of Classification Search ............... 60/722, 60/737, 748, 752
See application file for complete search history.

(56) References Cited

U.S. PATENT DOCUMENTS

| 3,990,232 | A |   | 11/1976 | Campbell |
| 4,222,230 | A |   | 9/1980  | Bobo et al. |
| 5,117,637 | A |   | 6/1992  | Howell et al. |
| 5,129,231 | A |   | 7/1992  | Becker et al. |
| 5,307,637 | A |   | 5/1994  | Stickles et al. |
| 5,623,827 | A | * | 4/1997  | Monty .......................... 60/748 |
| 6,314,739 | B1| * | 11/2001 | Howell et al. ................ 60/748 |
| 6,581,386 | B2| * | 6/2003  | Young et al. ................. 60/748 |
| 6,725,667 | B2|   | 4/2004  | Farmer et al. |
| 6,735,950 | B1|   | 5/2004  | Howell et al. |

* cited by examiner

*Primary Examiner*—L. J. Casaregola
(74) *Attorney, Agent, or Firm*—William Scott Andes; Armstrong Teasdale LLP

(57) ABSTRACT

A method for fabricating a dome assembly for a gas turbine engine combustor includes forming an annular dome plate including a plurality of substantially circular eyelets circumferentially spaced thereon, coupling a seal plate to the dome plate at each eyelet such that an opening defined in each seal plate is aligned substantially concentrically with respect to a respective eyelet, coupling a baffle to each seal plate such that an opening defined in each baffle is aligned substantially concentrically with respect to a respective eyelet, and coupling a swirler assembly having an integrally formed swirler and flare cone to each seal plate such that the flare cone extends at least partially through the baffle opening, and such that cooling air may be directed towards the flare cone through openings formed in the assembly.

16 Claims, 4 Drawing Sheets

METHODS AND APPARATUS FOR FABRICATING GAS TURBINE ENGINE COMBUSTORS

BACKGROUND OF THE INVENTION

This application relates generally to gas turbine engines and, more particularly, to combustors for gas turbine engine.

At least some known gas turbine engines include a compressor that provides compressed air to a combustor wherein the air is mixed with fuel and ignited for generating hot combustion gases. The gases flow downstream to one or more turbines that extract energy therefrom to power the compressor and provide useful work such as to power an aircraft in flight.

At least some known combustors used in gas turbine engines typically include inner and outer combustion liners joined at their upstream ends by a dome assembly. The dome assembly includes an annular spectacle plate or dome plate and a plurality of circumferentially spaced swirler assemblies or cups. Fuel is supplied to the dome where it is mixed with air discharged from the swirler assemblies to create a fuel/air mixture that is channeled to the combustor. Known combustors include a baffle that is exposed to high temperatures generated during the combustion process, and cooling air passages that channel cooling air to the baffle. Known cooling air channels do not regulate a precise air flow to the baffle, but rather, the cooling air is forced through gaps defined between the edges of the dome plate and the baffle.

In at least one known combustor, the dome assembly is manufactured by a brazing process, wherein the swirler assemblies and baffles are brazed to the dome plate. The brazing process may be a time consuming and labor-intensive procedure that may require the use of multiple fixtures and many expensive materials. Typically, at least some of the braze joints may be difficult to inspect, and may require considerable rework. Moreover, in at least one known combustor dome assembly, repairs are difficult or impossible, in that the repair of a brazed component requires that the dome assembly go through a braze oven which may undesireably cause damage to joints that previously did not require repair.

BRIEF SUMMARY OF THE INVENTION

In one aspect, a method for fabricating a dome assembly for a gas turbine engine combustor is provided. The method includes forming an annular dome plate including a plurality of substantially circular eyelets circumferentially spaced thereon, coupling a seal plate to the dome plate at each eyelet such that an opening defined in each seal plate is aligned substantially concentrically with respect to a respective eyelet, coupling a baffle to each seal plate such that an opening defined in each baffle is aligned substantially concentrically with respect to a respective eyelet, and coupling a swirler assembly having an integrally formed swirler and flare cone to each seal plate such that the flare cone extends at least partially through the baffle opening, and such that cooling air may be directed towards the flare cone through openings formed in the assembly.

In another aspect, a dome assembly for a gas turbine engine combustor is provided that includes at least one swirler assembly that includes a primary swirler and a secondary swirler. The secondary swirler is formed integrally with a flare cone, and the secondary swirler includes a cooling circuit formed therein channeling cooling air towards the flare cone.

In a further aspect, a gas turbine engine is provided. The gas turbine engine includes a combustor that includes at least one dome assembly. The at least one dome assembly includes at least one swirler assembly including a primary swirler and a secondary swirler. The secondary swirler is formed integrally with a flare cone. The secondary swirler includes a cooling circuit defined therein for channeling cooling air towards the flare cone.

DETAILED DESCRIPTION OF THE INVENTION

Figure 1:
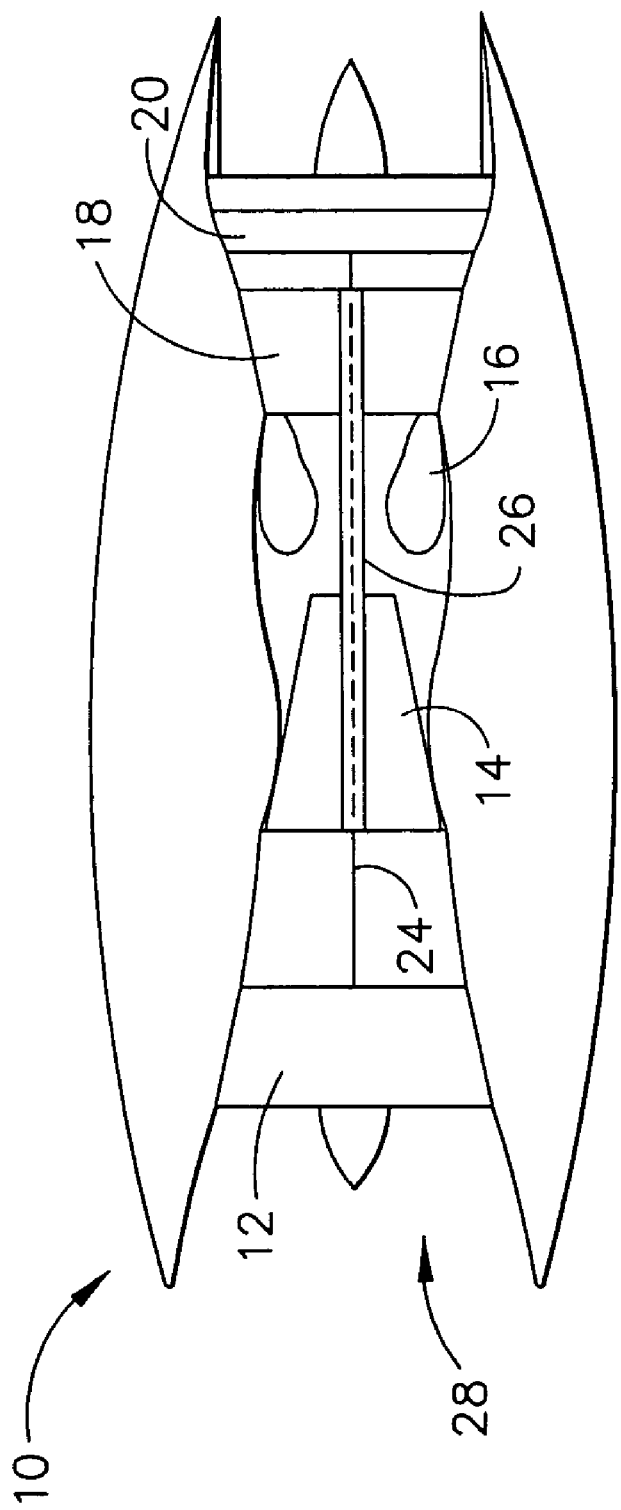
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18, and a low pressure turbine 20 arranged in a serial, axial flow relationship. Compressor 12 and turbine 20 are coupled by a first shaft 24, and compressor 14 and turbine 18 are coupled by a second shaft 26. In one embodiment, gas turbine engine 10 is a CF34-3 engine commercially available from General Electric Company, Cincinnati, Ohio.

In operation, air flows through low pressure compressor 12 from an upstream side 28 of engine 10. Compressed air is supplied from low pressure compressor 12 to high pressure compressor 14. Highly compressed air is then delivered to combustor assembly 16 where it is mixed with fuel and ignited. Combustion gases are channeled from combustor 16 to drive turbines 18 and 20.

Figure 2:
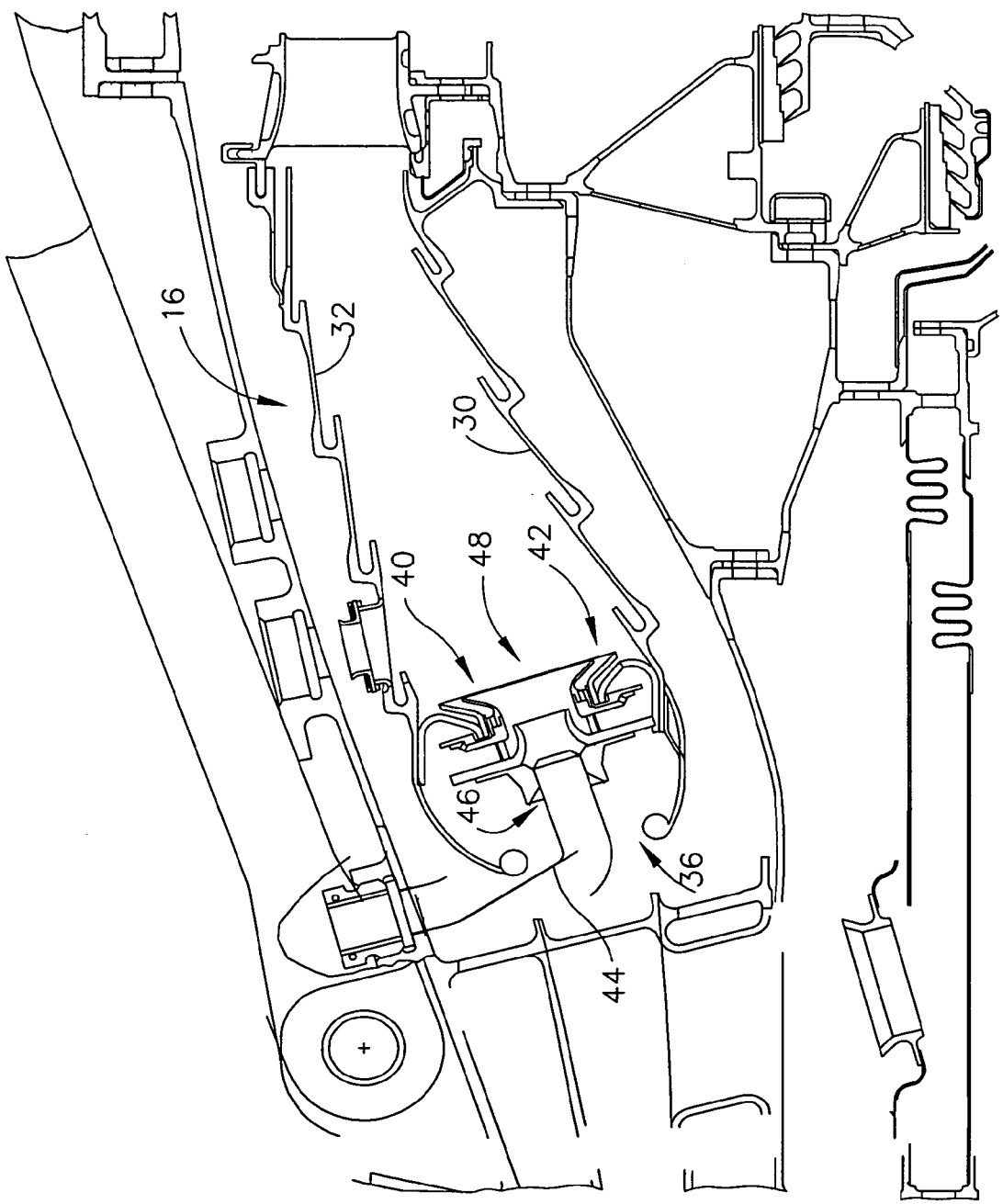
FIG. 2 is a schematic cross-sectional view of a combustor that may be used with the gas turbine engine shown in FIG. 1.

FIG. 2 is a cross-sectional view of a combustor, such as combustor 16, that may be used with gas turbine engine 10. Combustor 16 includes an inner liner 30 and an outer liner 32. Inner and outer liners 30 and 32 are joined at an upstream end 36 by a dome assembly 40. The cross section shown in FIG. 2 is taken through one of a plurality of swirler assemblies 42 that are mounted on dome assembly 40. A fuel line 44 delivers fuel to a fuel injector (not shown) that supplies fuel to an inlet 46 of swirler assembly 42. Fuel is mixed with air in swirler assembly 42 and the fuel/air mixture is introduced into combustor 16 from an outlet 48 of swirler assembly 42.

Figure 3:
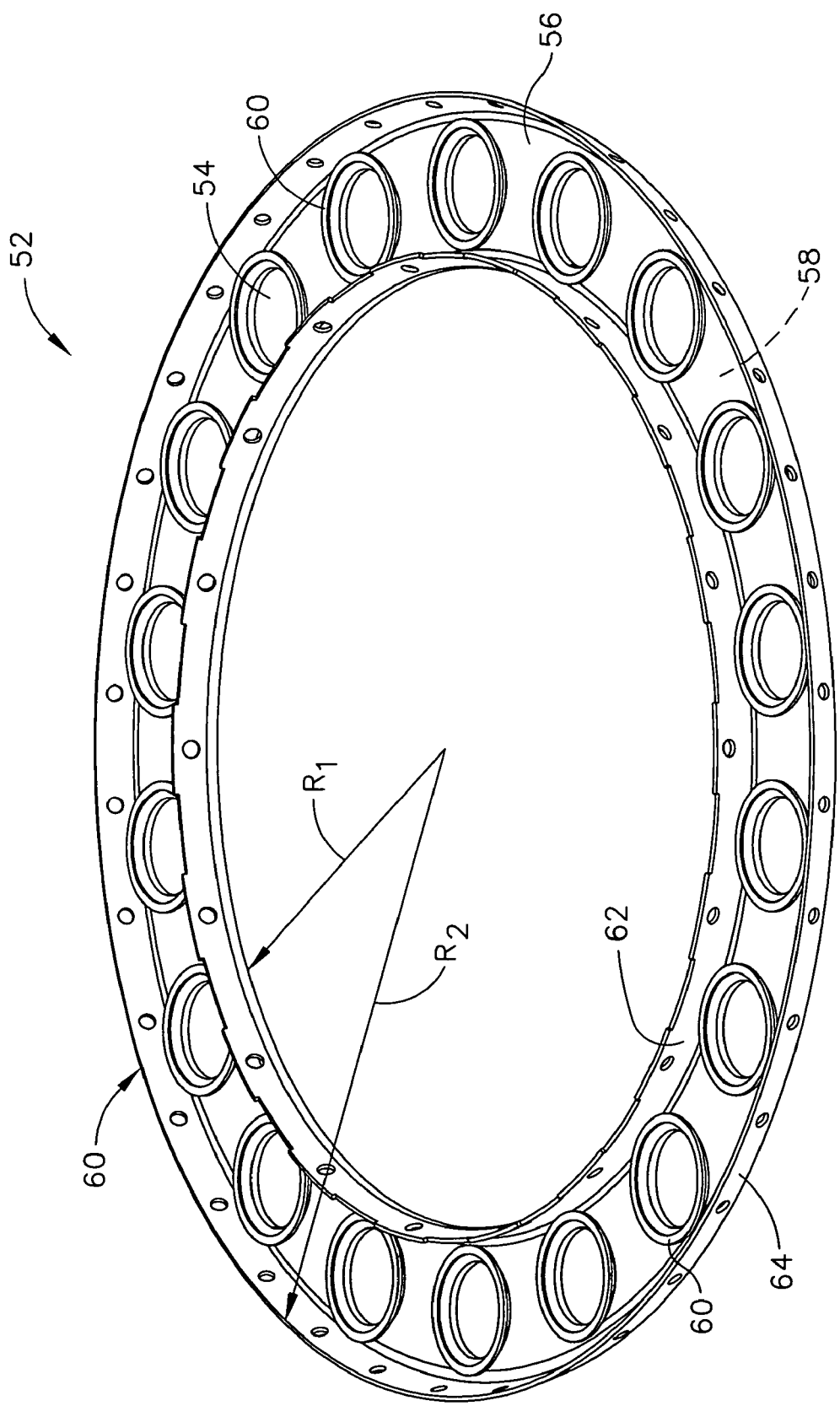
FIG. 3 is a perspective view of a dome plate.

FIG. 3 is a perspective view of a dome plate 52 that forms a part of dome assembly 40. Dome plate 52 is an annular member having a substantially circular profile. Dome plate 52 includes a plurality of openings or eyelets 54 circumferentially spaced between an inner radius $R_1$ and an outer radius $R_2$ of dome plate 52. Dome plate 52 has a forward or upstream facing side 56 and an aft or downstream facing side 58. A bushing or seal plate 60 is mounted on dome plate 52 at each eyelet 54. Dome plate 52 also includes an inner circumferential flange 62 and an outer circumferential flange 64 that are used to couple dome assembly 40 to combustor 16. In the exemplary embodiment, dome plate 52 is formed by a stamping operation and seal plate 60 is brazed to dome plate 52. The braze is applied to aft side 58 of dome plate 52 and flows to forward side 56. The braze joint can be visually inspected from forward side 56 to confirm that the braze joint is complete. Brazing provides structural strength between dome plate 52 and seal plate 60.

Figure 4:
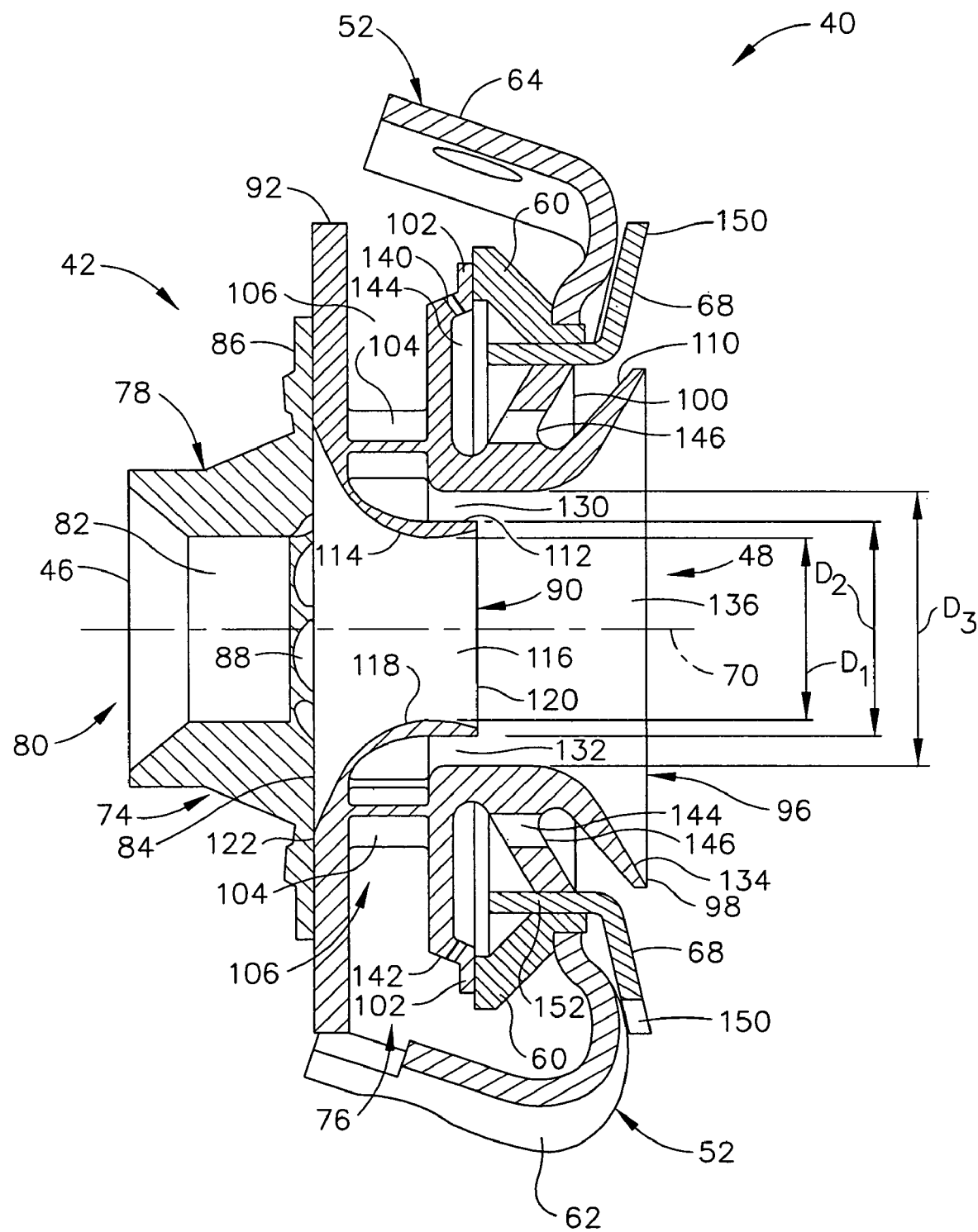
FIG. 4 is an enlarged cross-sectional view of the dome assembly shown in FIG. 2.

FIG. 4 is an enlarged cross-sectional view of dome assembly 40 shown in FIG. 2. Dome assembly 40 includes dome plate 52 with seal plate 60, swirler assembly 42, and a baffle 68. Dome plate 52, seal plate 60, and baffle 68 are aligned coaxially with an axial centerline 70 of swirler assembly 42. Swirler assembly 42 includes a primary swirler 74 and a secondary swirler 76.

Primary swirler 74 includes a body 78 that is generally cylindrical in shape and includes fuel inlet 46 at a forward end 80. Fuel inlet 46 opens into a fuel inlet channel 82 in body 78. Body 78 includes a base 84 and a generally circular flange 86 that extends radially outward from base 84. Flange 86 abuts secondary swirler 76. A plurality of passageways 88 are formed in base 84. Passageways 88 admit air into primary swirler 74 that mixes with fuel and imparts a swirling action to the fuel/air mixture.

Secondary swirler 76 includes a venturi section 90 from which a substantially circular flange 92 radially extends. A retainer ring (not shown) coupled to secondary swirler 76 holds primary swirler 74 in sliding engagement with secondary swirler 76. Some movement is allowed between primary swirler 74 and secondary swirler 76 to facilitate installation of a fuel injector on primary swirler 74. A flare cone section 96 is formed integrally with secondary swirler 76. Flare cone section 96 includes an exit cone 98, a substantially circular mid section 100, and a substantially circular flange 102. A plurality of swirler vanes 104 extend between flange 92 and flange 102. Flanges 92 and 102 define a swirler vane channel 106 that circumscribes venturi 90. Swirler vanes 104 are circumferentially spaced around venturi section 90 and are oriented so as to impart a swirling motion to air flowing through swirler vane channel 106. Flare cone section 96 includes a cooling air circuit that directs cooling air against an underside 110 of exit cone 98.

Venturi section 90 includes an outer wall 112 and an inner wall 114 that defines an axial flow path 116 that extends through venturi section 90 along axial centerline 70 of swirler assembly 42. Venturi section 90 includes a throat 118 and a venturi exit 120. Throat 118 has a converging-diverging cross sectional profile that extends from a forward facing surface 122 of flange 92 flange to venturi exit 120. Venturi throat 118 has a minimum diameter $D_1$. Venturi exit 120 extends into a throat 130 of flare cone section 96. Venturi exit 120 has a an outer diameter $D_2$ that is less than an inner diameter $D_3$ of throat 130 of flare cone section 96 such that a space 132 circumscribes venturi exit 120. Space 132 is in flow communication with swirler vane channel 106.

Exit cone 98 of flare cone 96 includes an inner wall 134 that defines a flare cone flow path 136 that extends along axial centerline 70 of swirler assembly 42. Flow path 136 culminates at swirler exit 48. Exit cone 98 is exposed to a combustion zone (not shown) within combustor 16. Flare cone section 96 is provided with a cooling circuit to cool exit cone 98. Flange 102 includes air holes 140 circumferentially spaced around a perimeter 142 of flange 102. Internal channels 144 cast into flange 102 and mid section 100 route cooling air to delivery holes 146 that direct cooling air to underside 110 of exit cone 98 to cool exit cone 98 and baffle 68. In an alternative embodiment, internal channels 144 are machined into flange 102 and mid section 100.

Baffle 68 is generally cylindrical in shape and includes a heat deflecting portion 150 that extends radially outward from an axial portion 152 that is coupled to seal plate 60. In the exemplary embodiment, baffle 68 is welded to seal plate 60. The welded attachment of baffle 68 to seal plate 60 facilitates repair and replacement of baffle 68.

Dome assembly 40 is fabricated by first stamping a dome plate 52 that includes a plurality of substantially circular openings or eyelets 54. A seal plate 60 is then brazed to dome plate 52 at each eyelet 54. In the braze operation, braze is applied to an aft side 58 of dome plate 52. Inspection of the braze joint is achieved visually by confirming the presence of braze filler from the forward side 56 of dome plate 52 after the braze heat cycle. In the exemplary embodiment, the seal plate-to-dome plate joint is the only brazed joint in dome assembly 40, which facilitates service and repair and also reduces rework. After seal plate 60 is installed, a baffle 68 is coupled to seal plate 60. In the exemplary embodiment, baffle 68 is welded to seal plate 60. Seal plate 60 and baffle 68 are assembled such openings in seal plate 60 and baffle 68 are concentric with eyelets 54 in dome plate 52.

Dome assembly 40 is completed by coupling a swirler assembly 42 having an integrally formed flare cone assembly 96 to each seal plate 60. In coupling swirler assembly 42 to seal plate 60, exit cone 98 of flair cone assembly 96 is passed through openings in eyelet 54, seal plate 60, and baffle 68. In the exemplary embodiment, swirler assembly 42 is welded to seal plate 60.

During operation, fuel is delivered to inlet 46 of primary swirler 74. The fuel is mixed with air and the fuel/air mixture is channeled downstream through venturi section 90 of secondary swirler 76. Fuel/air mixture exits venturi section 90 and is mixed with swirling air from swirler vane channel 106. Flare cone section 96 receives swirled air from swirler vane channel 106 and a fuel/air mix from venturi section 90 that is discharged into throat 130 of flare cone section 96. The fuel/air mixture is spread radially outward as it exits swirler assembly 42 through exit cone 98 and enters a burning zone within combustor 16. Cooling air is channeled through flange 102 and delivered between baffle 68 and underside 110 of exit cone 98. More specifically, cooling air is routed through channels 144 in flange 102 and directed towards underside 110 of exit cone 98.

The above-described dome assembly for a gas turbine engine combustor is cost-effective and reliable. The dome assembly is fabricated with only one braze joint which facilitates service and repair and reduces rework during initial assembly. The integrity of the braze joint can be visually inspected after a braze oven heat cycle. The dome assembly includes a swirler assembly that has an integral flare cone that includes a cooling circuit to cool the flare cone and baffle. As a result, the fabrication costs of the dome assembly are reduced while serviceability and reliability are improved.

Exemplary embodiments of combustor dome assemblies are described above in detail. The assemblies are not limited to the specific embodiments described herein, but rather, components of each assembly may be utilized independently and separately from other components described herein. Each dome assembly component can also be used in combination with other dome assembly components.

While the invention has been described in terms of various specific embodiments, those skilled in the art will recognize that the invention can be practiced with modification within the spirit and scope of the claims.

What is claimed is:

1. A dome assembly for a gas turbine engine combustor, said dome assembly comprising:

at least one swirler assembly comprising a primary swirler and a secondary swirler, said secondary swirler formed integrally with a flare cone, said secondary swirler comprising a cooling circuit formed therein channeling cooling air towards said flare cone;

a seal plate substantially circumscribing said flare cone; and an annular dome plate comprising at least one eyelet extending therethrough, said seal plate coupled to said dome plate within said at least one eyelet.

2. A dome assembly in accordance with claim 1 wherein said flare cone comprises a flange, said cooling circuit comprises a plurality of channels formed in said flange, each of said channels for channeling cooling air towards said flare cone for impingement cooling of said flare cone.

3. A dome assembly in accordance with claim 1 wherein said seal plate comprises an opening extending therethrough, said dome plate comprising an opening extending therethrough, said dome plate opening is aligned substantially concentrically with said seal plate opening.

4. A dome assembly in accordance with claim 3 wherein said seal plate is brazed to said dome plate.

5. A dome assembly in accordance with claim 3 wherein said dome plate opening and seal plate opening are each sized to receive said flare cone therethrough.

6. A dome assembly in accordance with claim 3 further comprising a baffle coupled to said seal plate.

7. A dome assembly in accordance with claim 6 wherein said cooling circuit is configured to channel cooling air between said flare cone and said baffle.

8. A dome assembly in accordance with claim 6 wherein said baffle comprises an opening extending therethrough, said baffle opening is aligned substantially concentrically with respect to said dome plate opening.

9. A gas turbine engine comprising a combustor comprising:

at least one dome assembly comprising:

at least one swirler assembly, comprising a primary swirler and a secondary swirler, said secondary swirler formed integrally with a flare cone, said secondary swirler comprising a cooling circuit defined therein for channeling cooling air towards said flare cone;

a seal plate substantially circumscribing said flare cone; and an annular dome plate comprising at least one eyelet extending therethrough, said seal plate coupled to said dome plate within said at least one eyelet.

10. A gas turbine engine in accordance with claim 9 wherein said flare cone comprises a flange, said cooling circuit comprises a plurality of channels formed in said flange for channeling cooling air to said flare cone for impingement cooling of said flare cone.

11. A gas turbine engine in accordance with claim 9 wherein said seal plate comprises an opening extending therethrough and aligned substantially concentrically with an opening extending through said dome plate.

12. A gas turbine engine in accordance with claim 11 wherein said seal plate is brazed to said dome plate.

13. A gas turbine engine in accordance with claim 11 wherein said dome plate opening and said seal plate opening are each sized to receive said flare cone therethrough.

14. A gas turbine engine in accordance with claim 11 further comprising a baffle coupled to said seal plate.

15. A gas turbine engine in accordance with claim 14 wherein said cooling circuit is configured to channel cooling air between said flare cone and said baffle.

16. A gas turbine engine in accordance with claim 9 wherein said at least one air swirler further comprises a venturi extending between said primary and said secondary swirlers.

\* \* \* \* \*